US009889885B2

(12) United States Patent
Kondo

(10) Patent No.: US 9,889,885 B2
(45) Date of Patent: Feb. 13, 2018

(54) SUSPENSION MEMBER

(71) Applicant: TOYOTA JIDOSHA KABUSHIKI KAISHA, Toyota-shi, Aichi-ken (JP)

(72) Inventor: Hideo Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 14/940,753

(22) Filed: Nov. 13, 2015

(65) Prior Publication Data

US 2016/0152270 A1    Jun. 2, 2016

(30) Foreign Application Priority Data

Nov. 27, 2014    (JP) ................... 2014-240270

(51) Int. Cl.
*B62D 21/00* (2006.01)
*B62D 21/11* (2006.01)
*B62D 21/15* (2006.01)

(52) U.S. Cl.
CPC .............. *B62D 21/00* (2013.01); *B62D 21/11* (2013.01); *B62D 21/155* (2013.01)

(58) Field of Classification Search
CPC ....... B62D 21/00; B62D 21/11; B62D 21/155
See application file for complete search history.

(56) References Cited

U.S. PATENT DOCUMENTS

| 7,584,815 | B2 | 9/2009 | Ogawa et al. |
| 8,740,231 | B2 | 6/2014 | Shibaya |
| 9,434,417 | B2 * | 9/2016 | Imanishi ................. B22C 9/10 |
| 9,616,932 | B2 * | 4/2017 | Nusier ................. B62D 21/155 |
| 9,764,764 | B2 * | 9/2017 | Irle ........................ B62D 21/04 |
| 9,776,660 | B2 * | 10/2017 | Imanishi ................. B62D 21/11 |
| 2001/0022437 | A1 * | 9/2001 | Suzuki ..................... B60G 7/02 |
| | | | 280/124.134 |
| 2003/0094803 | A1 * | 5/2003 | Fujiki .................. B62D 21/155 |
| | | | 280/784 |
| 2009/0051154 | A1 | 2/2009 | Eickmann et al. |

(Continued)

FOREIGN PATENT DOCUMENTS

| CN | 101263042 A | 9/2008 |
| EP | 1686042 A1 | 8/2006 |

(Continued)

*Primary Examiner* — Barry Gooden, Jr.
(74) *Attorney, Agent, or Firm* — Oliff PLC

(57) ABSTRACT

A suspension member is provided with a torque rod mounting portion, vehicle body mounting portions, gearbox mounting portions and bead portions. The torque rod mounting portion is provided at a vehicle width direction central portion of a suspension member main body. The vehicle body mounting portions are provided at vehicle width direction outer side end portions of the suspension member main body. The gearbox mounting portions are provided at the vehicle width direction outer sides of the suspension member main body relative to the torque rod mounting portion, and at the vehicle width direction inner sides relative to the vehicle body mounting portions. The bead portions are provided at the vehicle width direction outer sides of the suspension member main body relative to the gearbox mounting portions, and at the vehicle width direction inner sides relative to the vehicle body mounting portions, and extend in the vehicle body front-and-rear direction.

12 Claims, 7 Drawing Sheets

(56) References Cited

U.S. PATENT DOCUMENTS

| | | | | |
|---|---|---|---|---|
| 2010/0231005 A1* | 9/2010 | Yoshida | ............... | B62D 3/12 296/203.02 |
| 2011/0266785 A1* | 11/2011 | Mildner | ............... | B62D 21/11 280/785 |
| 2012/0104739 A1* | 5/2012 | Buschjohann | ..... | B22D 19/0072 280/781 |
| 2013/0168939 A1* | 7/2013 | Buschjohann | ........... | B62D 3/12 280/124.109 |
| 2013/0175780 A1 | 7/2013 | Eickmann et al. | | |
| 2013/0241186 A1* | 9/2013 | Shibaya | ............... | B62D 21/11 280/781 |
| 2014/0049032 A1* | 2/2014 | Urata | ................ | B62D 21/02 280/795 |
| 2014/0091599 A1* | 4/2014 | Marchena | ............ | B62D 21/11 296/203.02 |
| 2014/0232143 A1* | 8/2014 | Renner | ............... | B62D 21/11 296/193.07 |
| 2014/0300137 A1* | 10/2014 | Komiya | ............... | B62D 21/11 296/187.11 |
| 2015/0075896 A1* | 3/2015 | Imanishi | ............... | B62D 21/11 180/312 |
| 2015/0076805 A1* | 3/2015 | Imanishi | ............... | B22D 17/22 280/781 |
| 2015/0166104 A1 | 6/2015 | Ohhama et al. | | |
| 2016/0068189 A1* | 3/2016 | Imanishi | ............... | B22C 9/10 296/204 |
| 2016/0090125 A1* | 3/2016 | Imanishi | ............... | B22C 9/10 180/312 |
| 2016/0152272 A1* | 6/2016 | Tomikuda | ............ | B62D 21/02 296/203.01 |
| 2016/0221606 A1* | 8/2016 | Irle | ............... | B62D 21/11 |
| 2017/0029038 A1* | 2/2017 | Sato | ............... | B62D 25/2018 |
| 2017/0113723 A1* | 4/2017 | Murata | ............... | B62D 21/152 |
| 2017/0120953 A1* | 5/2017 | Tomikuda | ............ | B62D 21/155 |
| 2017/0166256 A1* | 6/2017 | Pavel | ............... | B62D 21/11 |

FOREIGN PATENT DOCUMENTS

| | | |
|---|---|---|
| FR | 2890633 A1 | 3/2007 |
| JP | H08310438 A | 11/1996 |
| JP | 2001106116 A | 4/2001 |
| JP | 2004-210135 A | 7/2004 |
| JP | 2010137736 A | 6/2010 |
| WO | 2014/017260 A1 | 1/2014 |

\* cited by examiner

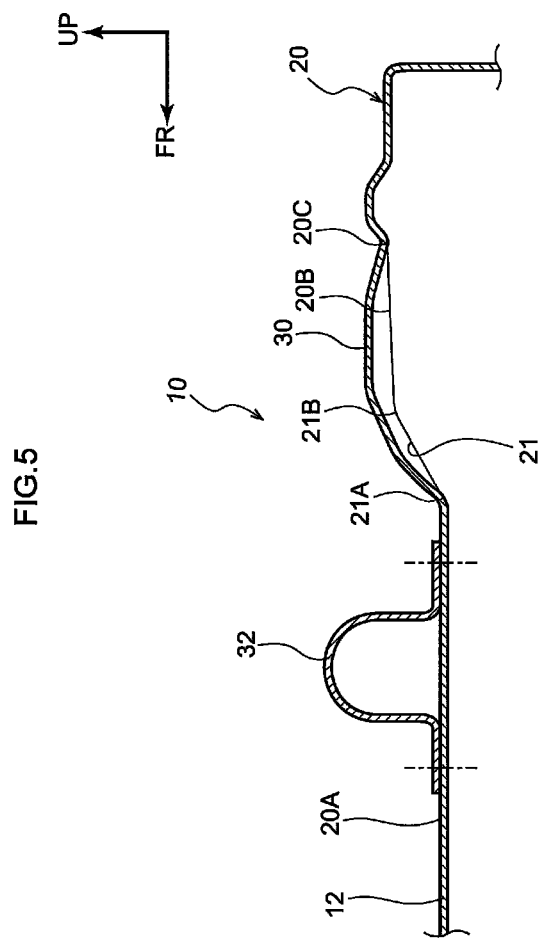

SUSPENSION MEMBER

CROSS-REFERENCE TO RELATED APPLICATION

This application is based on and claims priority under 35 USC 119 from Japanese Patent Application No. 2014-240270 filed on Nov. 27, 2014, the entire disclosure of which is incorporated by reference herein.

BACKGROUND

Technical Field

Preferred embodiments relate to a suspension member.

Related Art

A suspension member provided with a mounting bracket for mounting an engine torque rod at a vehicle width direction central portion is known (for example, see Japanese Patent Application Laid-Open (JP-A) No. 2010-137736). A structure in which reinforcement beads are provided at locations of mounting of a suspension member to a vehicle body, such that vibrations occurring in the suspension member are attenuated, also is known (for example, see JP-A No. 2001-106116).

However, if a resonance frequency (a characteristic frequency) of up-and-down (vertical) direction vibrations of an engine torque rod and a resonance frequency (a characteristic frequency) of up-and-down (vertical) direction vibrations of a suspension member are close to each other, booming sounds may be produced during running of the vehicle.

SUMMARY

Preferred embodiments provide a suspension member to suppress the production of booming sounds during running of a vehicle.

A suspension member according to a preferred embodiment includes: a suspension member main body; a torque rod mounting portion provided at a central portion of the suspension member main body, the central portion located centrally in a vehicle width direction; a vehicle body mounting portion provided at an outer side end portion of the suspension member main body in the vehicle width direction; a gearbox mounting portion provided at an outer side of the suspension member main body in the vehicle width direction relative to the torque rod mounting portion, and at an inner side of the suspension member main body in the vehicle width direction relative to the vehicle body mounting portion; and a bead portion provided at the outer side of the suspension member main body in the vehicle width direction relative to the gearbox mounting portion, and at the inner side of the suspension member main body in the vehicle width direction relative to the vehicle body mounting portion, the bead portion extending in a vehicle body front-and-rear direction.

According to the preferred embodiment, the bead portion that extends in the vehicle body front-and-rear direction is provided on the suspension member that includes the torque rod mounting portion, and the bead portion is located at the vehicle width direction outer side relative to the gearbox mounting portion but at the vehicle width direction inner side relative to the vehicle body mounting portion. Because of this bead portion, the resonance frequency of up-and-down (vertical) direction vibrations of the suspension member is inhibited from being close to the resonance frequency of up-and-down (vertical) direction vibrations of an engine torque rod. As a result, the production of booming sounds during running of the vehicle is suppressed. The meaning of the term "central portion" as used herein includes a substantially central portion that can be offset a small amount in the vehicle width direction from a precisely central portion.

It is preferable that the bead portion is provided at a location that is closer to the gearbox mounting portion than to the vehicle body mounting portion.

With a structure in which the bead portion is provided at the location that is closer to the gearbox mounting portion than to the vehicle body mounting portion, stiffness in the vicinity of the gearbox mounting portion, which is susceptible to vibrations, is raised by the bead portion. Thus, up-and-down direction vibrations of the suspension member are further suppressed.

The suspension member preferably includes a stabilizer bar mounting portion provided at a vehicle body forward (front) side of the suspension member main body relative to the bead portion, wherein the stabilizer bar mounting portion is provided at a front side upper face of the suspension member main body, the gearbox mounting portion is provided at a rear side upper face of the suspension member main body, and the front side upper face is formed at a lower level than the rear side upper face It is preferable that the bead portion covers a boundary portion between the front side upper face and the rear side upper face in a sectional view.

With the above structure in which the bead portion covers the boundary portion between the front side upper face at which the stabilizer bar mounting portion is provided and the rear side upper face at which the gearbox mounting portion is provided, stiffness at the boundary portion, which is susceptible to vibrations, is raised by the bead portion and up-and-down direction vibrations of the suspension member are further suppressed.

According to the preferred embodiment, the production of booming sounds during running of the vehicle may be suppressed.

According to the preferred embodiment, the stiffness of the vicinity of the gearbox mounting portion that is susceptible to vibrations is raised by the bead portion and up-and-down direction vibrations of the suspension member is suppressed.

According to the preferred embodiment, the stiffness of the boundary portion that is susceptible to vibrations is raised by the bead portion and up-and-down direction vibrations of the suspension member are suppressed.

BRIEF DESCRIPTION OF THE DRAWINGS

Exemplary embodiments will be described in detail based on the following figures, wherein:

FIG. 5 is a sectional diagram taken along line Y-Y of FIG. 3;

DETAILED DESCRIPTION

Figure 1:
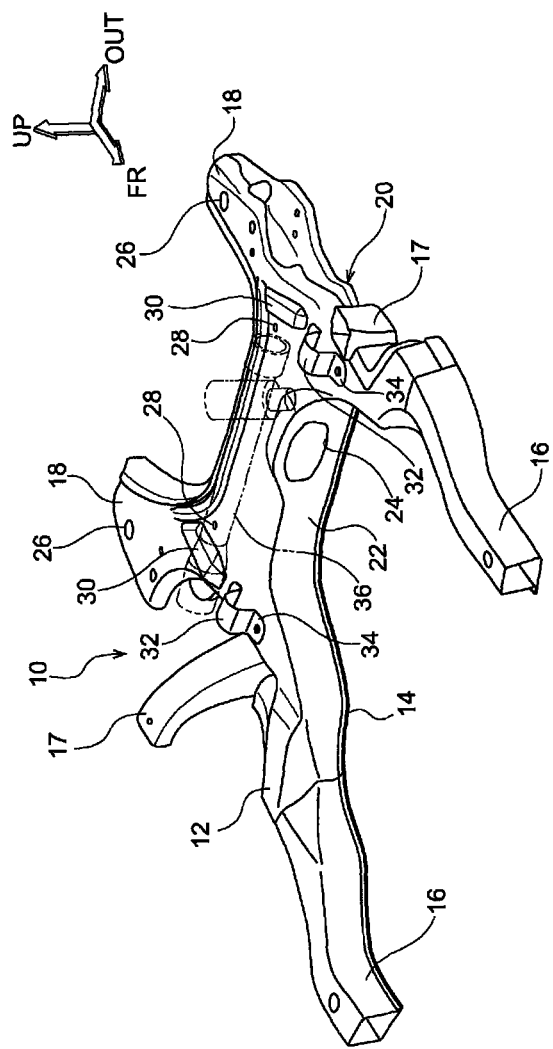
FIG. 1 is a perspective view of a suspension member in accordance with one exemplary embodiment.

Exemplary embodiments will be described in detail in accordance with the drawings. For convenience of description, the arrow UP that is shown where appropriate in the drawings indicates a vehicle body upward direction, the arrow FR indicates a vehicle body forward direction, and the arrow OUT indicates a vehicle width direction outer side. In the following description, where the directions up, down, front, rear, left and right are recited without being particularly specified, the same represent up and down in the vehicle body up-and-down (vertical) direction, the front and rear in the vehicle body front-and-rear direction, and left and right in the vehicle body left-and-right direction (the vehicle width direction).

As shown in FIG. 1, a suspension member 10 is supported in a suspended state by a pair of left and right front side members (not shown in the drawings), which are members of the vehicle body framework. The suspension member 10 is structured by an upper member 12 and a lower member 14 that are joined together. The suspension member 10 is provided with a suspension member main body 20 whose length direction is in the vehicle width direction (that is, the main body 20 extends in the vehicle width direction).

A torque rod mounting hole 24 is formed at a substantially central portion in a vehicle width direction of a front wall 22 of the suspension member main body 20 (i.e., of the upper member 12). The torque rod mounting hole 24 serves as a torque rod mounting portion at which a rear end portion of an engine torque rod, which is not shown in the drawings, is mounted. The torque rod mounting hole 24 that is shown in the drawings is formed in a substantially elliptical shape whose long axis is in the vehicle width direction, but the torque rod mounting hole 24 is not particularly limited to this shape.

The suspension member 10 integrally includes front arm portions 16 and square portions 17. The front arm portions 16 extend in substantially square column shapes to the vehicle body forward (front) side from each of vehicle width direction outer side end portions of the suspension member main body 20 (i.e., two end portions of the front wall 22). The square portions 17 are in substantially square column shapes and extend to the vehicle body upper side from each of the vehicle width direction outer side end portions (the two end portions) of the suspension member main body 20.

Figure 2:
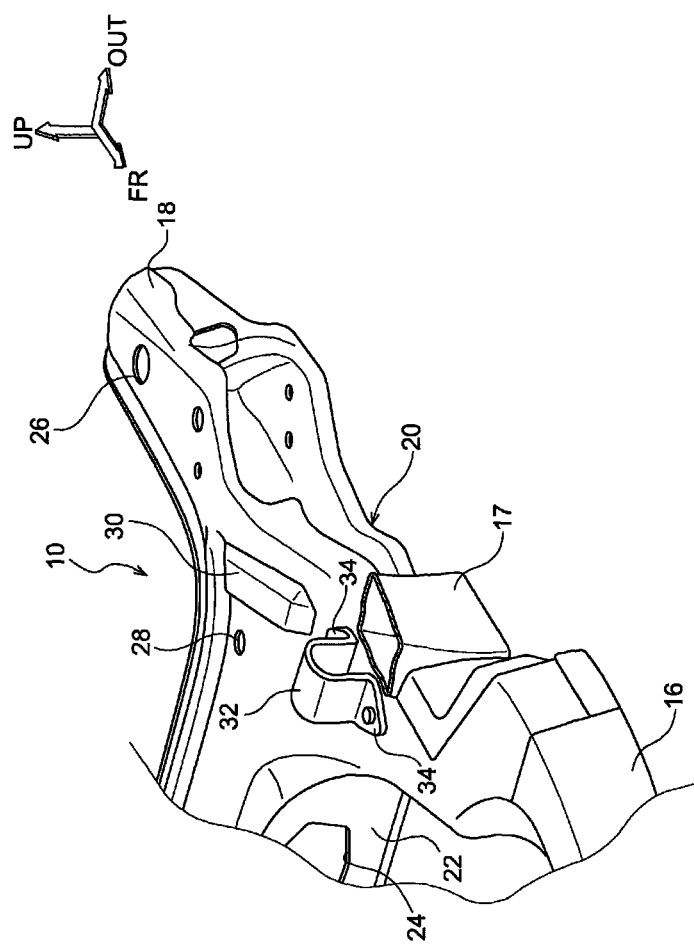
FIG. 2 is a perspective view showing an enlargement of a portion of the suspension member of FIG. 1.
Figure 3:
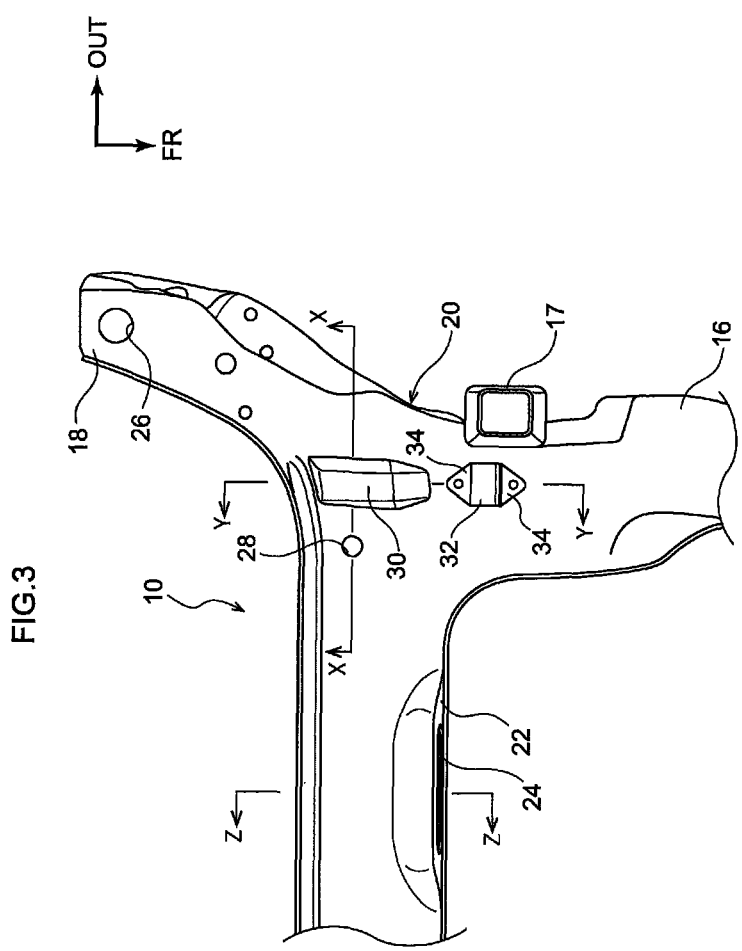
FIG. 3 is a plan view showing an enlargement of a portion of the suspension member of FIG. 1.

The front end portion of each front arm portion 16 is supported at the respective front side member via a support member of the vehicle that is not shown in the drawings. An upper end portion of each square portion 17 is directly attached to the respective front side member. In FIG. 1 to FIG. 3, portions of the square portion 17 at the vehicle body left side are not shown.

The suspension member 10 also integrally includes rear portions 18 in substantial flat plate shapes. The rear portions 18 project to the vehicle rearward side from each of the vehicle width direction outer side end portions of the suspension member main body 20. Each rear portion 18 is also directly attached to the respective front side member. Accordingly, a circular vehicle body mounting hole 26, which serves as a vehicle body mounting portion, is formed to correspond with the respective front side member at the vehicle body rear side end portion of each rear portion 18.

That is, a bolt that is not shown in the drawings is inserted into the vehicle body mounting hole 26 from the vehicle body lower side and is screwed into a weld nut (not shown in the drawings) that is provided at the front side member. Thus, a structure is formed in which the rear portions 18 are fixed by fastening to the front side members. As a result, the suspension member 10 is supported at the front side members in the suspended state.

As shown in FIG. 1 to FIG. 3, circular gearbox mounting holes 28 are formed as a left and right pair in the suspension member main body 20, at the vehicle width direction outer sides relative to the torque rod mounting hole 24, and at the vehicle width direction inner sides relative to the vehicle body mounting holes 26 (the rear portions 18). The gearbox mounting holes 28 serve as a gearbox mounting portion for mounting a steering gearbox 36 having a substantially circular tube shape (cylindrical shape) (see FIG. 1), in which steering gears are incorporated.

Although not shown in the drawings, a pair of left and right mounting brackets are provided at an outer periphery of the steering gearbox 36. Penetrating holes for bolt insertion are formed in the mounting brackets. Accordingly, bolts, which are not shown in the drawings, are inserted through the penetrating holes of the mounting brackets and the gearbox mounting holes 28 from the vehicle body upper side thereof and are screwed into weld nuts (not shown in the drawings) that are provided at an inner face of the suspension member main body 20 (i.e., the upper member 12). Thus, a structure is formed in which the steering gearbox 36 is fixed by fastening to the suspension member main body 20.

Further, as shown into FIG. 1 to FIG. 3, a pair of left and right bead portions 30 are integrally formed at the suspension member main body 20 (i.e., the upper member 12), at the vehicle width direction outer sides relative to the gearbox mounting holes 28, and at the vehicle width direction inner sides relative to the vehicle body mounting holes 26 (the rear portions 18). Each bead portion 30 extends in the vehicle body front-and-rear direction (i.e., the length direction of the bead portion 30 is in the vehicle body front-and-rear direction).

Figure 4:
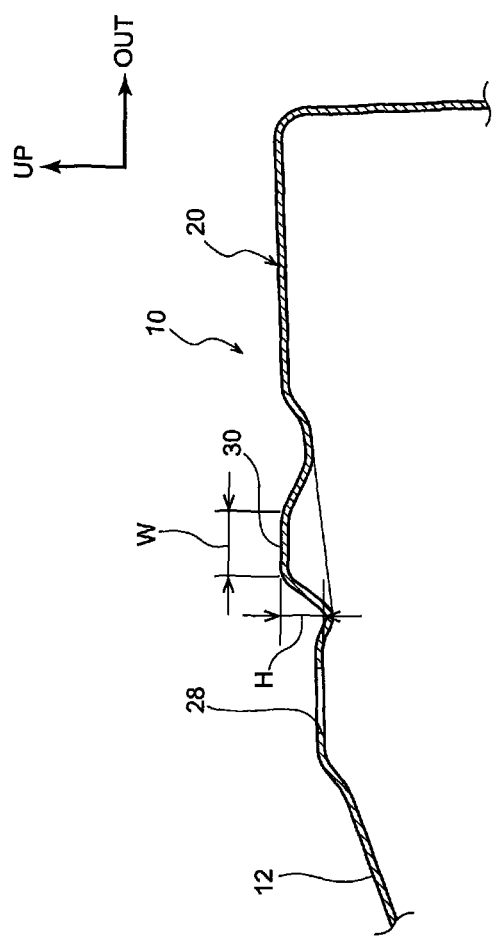
FIG. 4 is a sectional diagram taken along line X-X of FIG. 3.

Each bead portion 30 is formed so as to bulge toward the vehicle body upper side in a shape with left-right symmetry. As shown in FIG. 4, the bead portion 30 is formed such that a maximum width W of the bead portion 30 in the vehicle width direction is greater than a maximum height H thereof from a rear side upper face 20B, which is described below (i.e., W>H). The bead portion 30 is formed at a location closer to (adjacent to) the respective gearbox mounting hole 28 than to the respective vehicle body mounting hole 26.

A pair of left and right stabilizer bar brackets 32 are provided at the suspension member main body 20, at the vehicle body forward side relative to the bead portions 30. The stabilizer bar brackets 32 serve as a stabilizer bar mounting portion for mounting a stabilizer bar, which is not shown in the drawings. Each stabilizer bar bracket 32 is formed in a substantial "U" shape in cross section. Front and rear flange portions 34 of the stabilizer bar bracket 32 are fixed by bolt-fastening to the suspension member main body 20 (the upper member 12).

As shown in FIG. 5, the stabilizer bar brackets 32 are provided at a front side upper face 20A of the suspension member main body 20 (i.e., of the upper member 12). The front side upper face 20A is formed at a lower level than the rear side upper face 20B of the suspension member main body 20 (i.e., of the upper member 12) at which the gearbox mounting holes 28 are formed. In a sectional view according to FIG. 5, each bead portion 30 covers an inclined wall 21 that serves as a boundary portion between the front side upper face 20A and the rear side upper face 20B.

To describe this in more detail, the front side upper face 20A and the rear side upper face 20B are both flat faces but the heights thereof are different. Therefore, the inclined wall 21 that is angled to the vehicle body rearward-upper side (and the vehicle body forward-lower side) is formed between the front side upper face 20A and the rear side upper face 20B. The bead portion 30 extends in the vehicle body front-and-rear direction so as to reach from a ridge line portion 20C at the vehicle body rearward side of the rear side upper face 20B, covering a ridge line portion 21B that is a boundary line between the inclined wall 21 and the rear side upper face 20B, to a ridge line portion 21A that is a boundary line between the inclined wall 21 and the front side upper face 20A.

Now, operation of the suspension member 10 with the structure described above is described.

Figure 7A:
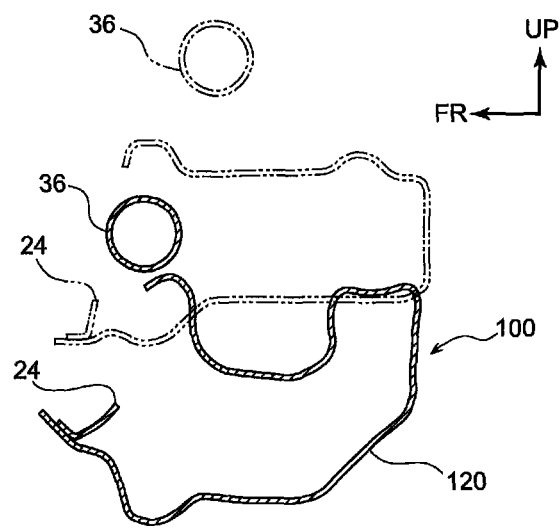
FIG. 7A is a sectional diagram corresponding to FIG. 6A, exaggeratedly illustrating a vibration state of a suspension member in accordance with a comparative example.
Figure 7B:
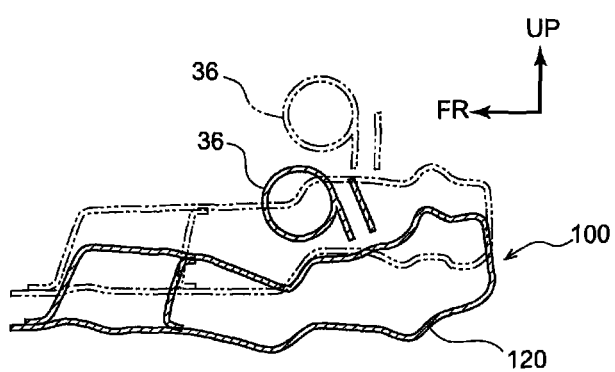
FIG. 7B is a sectional diagram corresponding to FIG. 6B, exaggeratedly illustrating a vibration state of the suspension member in accordance with the comparative example.

First, a suspension member 100 according to a comparative example that is shown in FIG. 7A and FIG. 7B is described. The suspension member 100 according to this comparative example is an ordinary suspension member that includes the torque rod mounting hole 24 but does not include the bead portions 30. A region of the suspension member 100 that is most susceptible to vehicle body up-and-down direction vibrations during running of the vehicle is a region that is not fixed by fastening to the front side members, that is, a region of a suspension member main body 120 at which the steering gearbox 36 is disposed (which includes the torque rod mounting hole 24).

FIG. 7A and FIG. 7B exaggeratedly show an action of the suspension member main body 120 and the steering gearbox 36 during running of the vehicle. As shown in FIG. 7A, the region of the suspension member main body 120 at which the steering gearbox 36 is disposed vibrates greatly in the vehicle body up-and-down direction. Consequently, as shown in FIG. 7B, both the left and right sides of the suspension member main body 120 relatively greatly vibrate in the vehicle body up-and-down direction.

In contrast, in the suspension member 10 according to the present exemplary embodiment, the bead portions 30 that bulge toward the vehicle body upper side are each formed at the aforementioned locations adjacent to the gearbox mounting holes 28 at which the steering gearbox 36 is mounted. Each bead portion 30 is formed with the aforementioned width W at the suspension member main body 20 and extends in the vehicle body front-and-rear direction, covering the inclined wall 21. Thus, the bead portion 30 is formed so as to blanket (extend over and cover) the ridge line portion 20C, the ridge line portion 21B and the ridge line portion 21A.

Therefore, the stiffness of the region of the suspension member main body 20 at which the steering gearbox 36 is disposed (including portions of the inclined wall 21 that are close to the torque rod mounting hole 24 and the gearbox mounting holes 28) may be effectively raised. As a result, vibrations of the region of the suspension member main body 20 at which the steering gearbox 36 is disposed may be effectively suppressed.

Figure 6A:
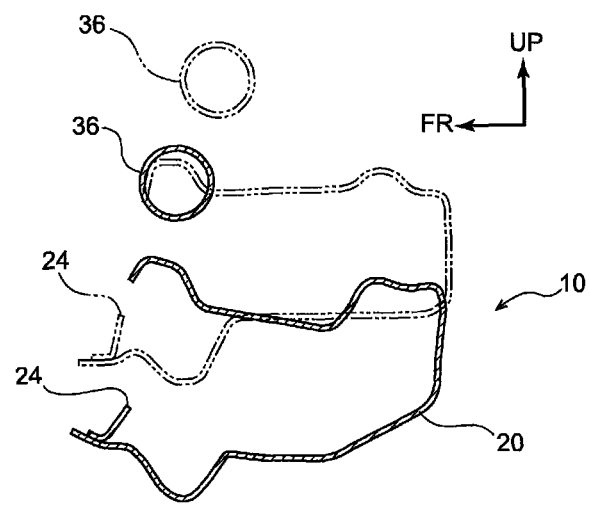
FIG. 6A is a sectional diagram taken along line Z-Z of FIG. 3, exaggeratedly illustrating a vibration state of the suspension member of a preferred embodiment.
Figure 6B:
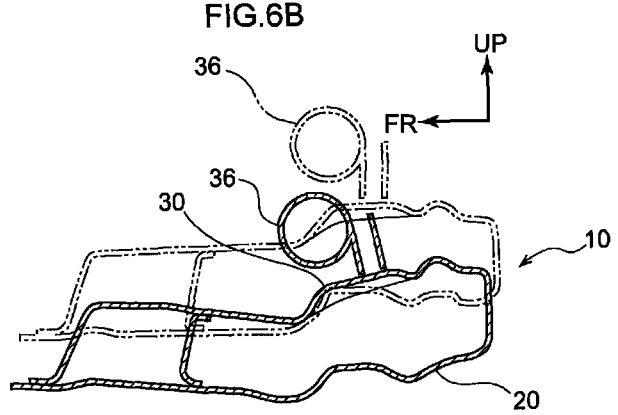
FIG. 6B is a sectional diagram corresponding to FIG. 5, exaggeratedly illustrating a vibration state of the suspension member of a preferred embodiment.

FIG. 6A and FIG. 6B exaggeratedly show the action of the suspension member main body 20 and the steering gearbox 36 during running of the vehicle. As shown in FIG. 6A, vehicle body up-and-down direction vibrations of the region of the suspension member main body 20 at which the steering gearbox 36 is disposed are attenuated compared to vehicle body up-and-down direction vibrations of the suspension member main body 120 according to the comparative example.

As a result, as shown in FIG. 6B, vehicle body up-and-down direction vibrations of both the left and right sides of the suspension member main body 20 are also attenuated compared to vehicle body up-and-down direction vibrations of both the left and right sides of the suspension member main body 120 according to the comparative example.

The resonance frequency (characteristic frequency) of up-and-down direction vibrations of the suspension member 100 according to the comparative example may be close to the resonance frequency (characteristic frequency) of up-and-down direction vibrations of the engine torque rod. In this case, booming sounds may be produced during running of the vehicle.

In contrast, because the pair of left and right bead portions 30 are integrally formed, the resonance frequency (characteristic frequency) of up-and-down direction vibrations of the suspension member 10 (the suspension member main body 20) according to the present exemplary embodiment is different from the resonance frequency of the suspension member 100 (the suspension member main body 120) according to the comparative example.

That is, the resonance frequency of up-and-down direction vibrations of the suspension member 10 may be made more distant from the resonance frequency of up-and-down direction vibrations of the engine torque rod. Therefore, the production of booming sounds during running of the vehicle may be suppressed (the pressure response may be reduced).

Furthermore, in the suspension member 10 according to the present exemplary embodiment, because it is sufficient simply to form the pair of left and right bead portions 30 at the suspension member main body 20 (the upper member 12), a deterioration in fuel efficiency caused by an increase in weight in accordance with an increase in a number of components may be suppressed or prevented. Moreover, an increase in a number of assembly steps in accordance with an increase in the number of components may be suppressed or prevented.

Hereabove, the suspension member 10 according to the present exemplary embodiment has been described on the basis of the attached drawings. However, the suspension member 10 according to the present exemplary embodiment is not limited to the illustrated structures. For example, it is sufficient if the shape of each bead portion 30 is a shape that may suppress vibrations of the suspension member main body 20; the shape of the bead portion 30 is not limited to the shape shown in the drawings.

Further, provided vibrations of the suspension member main body 20 may be suppressed, each bead portion 30 may be provided at a location that is closer to the gearbox mounting hole 28 than to the vehicle body mounting hole 26. Further again, provided vibrations of the suspension member main body 20 may be suppressed, the bead portion 30 need not be provided to cover (so as to blanket) the inclined wall 21 that is the boundary portion between the front side upper face 20A and the rear side upper face 20B, which is to say the ridge line portions 20C, 21B and 21A.

What is claimed is:
1. A suspension member comprising:
  a suspension member main body;

a torque rod mounting portion provided at a central portion of the suspension member main body, the central portion located centrally in a vehicle width direction relative to a vehicle in which the suspension member is to be mounted;

a vehicle body mounting portion provided at an outer side end portion of the suspension member main body in the vehicle width direction;

a gearbox mounting portion provided at an outer side of the suspension member main body in the vehicle width direction relative to the torque rod mounting portion, and at an inner side of the suspension member main body in the vehicle width direction relative to the vehicle body mounting portion;

a bead portion provided at the outer side of the suspension member main body in the vehicle width direction relative to the gearbox mounting portion, and at the inner side of the suspension member main body in the vehicle width direction relative to the vehicle body mounting portion, the bead portion extending in a vehicle body front-and-rear direction; and a stabilizer bar mounting portion provided at a vehicle body front side of the suspension member main body relative to the bead portion, wherein the stabilizer bar mounting portion is provided at a front side upper face of the suspension member main body, the gearbox mounting portion is provided at a rear side upper face of the suspension member main body, and the front side upper face is formed at a lower level than the rear side upper face, and the bead portion covers a boundary portion between the front side upper face and the rear side upper face in a sectional view.

2. The suspension member according to claim 1, wherein the bead portion is provided at a location that is closer to the gearbox mounting portion than to the vehicle body mounting portion.

3. The suspension member according to claim 1, wherein the bead portion protrudes in an upward direction from surrounding portions of the front side upper face and the rear side upper face of the suspension member main body.

4. The suspension member according to claim 1, wherein the torque rod mounting portion includes a hole in a front-facing surface of the suspension member main body.

5. The suspension member according to claim 1, wherein the vehicle body mounting portion includes a mounting hole.

6. The suspension member according to claim 1, wherein the gearbox mounting portion includes a mounting hole.

7. A suspension member comprising:

a suspension member main body that extends in a vehicle width direction relative to a vehicle in which the suspension member is to be mounted;

a torque rod mount provided at a central portion of the suspension member main body, the central portion located centrally in the vehicle width direction;

a vehicle body mount attached to the suspension member main body and provided outward of the torque rod mount with respect to the vehicle width direction;

a gearbox mount provided on the suspension member main body between the torque rod mount and the vehicle body mount with respect to the vehicle width direction;

a bead portion provided on the suspension member main body between the gearbox mount and the vehicle body mount with respect to the vehicle width direction, the bead portion extending in a vehicle body front-and-rear direction; and a stabilizer bar mount provided at a vehicle body front side of the suspension member main body relative to the bead portion, wherein the stabilizer bar mount is provided at a front side upper face of the suspension member main body, the gearbox mount is provided at a rear side upper face of the suspension member main body, and the front side upper face is formed at a lower level than the rear side upper face, and the bead portion covers a boundary portion between the front side upper face and the rear side upper face in a sectional view.

8. The suspension member according to claim 7, wherein the bead portion is provided at a location that is closer to the gearbox mount than to the vehicle body mount.

9. The suspension member according to claim 7, wherein the bead portion protrudes in an upward direction from surrounding portions of the front side upper face and the rear side upper face of the suspension member main body.

10. The suspension member according to claim 7, wherein the torque rod mount includes a hole in a front-facing surface of the suspension member main body.

11. The suspension member according to claim 7, wherein the vehicle body mount includes a mounting hole.

12. The suspension member according to claim 7, wherein the gearbox mount includes a mounting hole.

* * * * *